United States Patent
Yano et al.

(10) Patent No.: US 7,882,878 B2
(45) Date of Patent: *__Feb. 8, 2011__

(54) RADIAL TIRE FOR AIRPLANE

(75) Inventors: Takeshi Yano, Tokyo (JP); Susumu Ishizaki, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 1066 days.

This patent is subject to a terminal disclaimer.

(21) Appl. No.: 11/648,617

(22) Filed: Jan. 3, 2007

(65) Prior Publication Data
US 2007/0221307 A1    Sep. 27, 2007

(30) Foreign Application Priority Data
Jan. 4, 2006    (JP) ............... 2006-000094

(51) Int. Cl.
*B60C 9/18* (2006.01)
*B60C 9/20* (2006.01)
*B60C 9/22* (2006.01)

(52) U.S. Cl. ............ 152/527; 152/451; 152/531; 152/533

(58) Field of Classification Search ............ 152/451, 152/527, 531, 533
See application file for complete search history.

(56) References Cited

U.S. PATENT DOCUMENTS

2005/0194081 A1 * 9/2005 Yano et al. ............ 152/527
2008/0135152 A1 * 6/2008 Nakajima

FOREIGN PATENT DOCUMENTS

| | | | |
|---|---|---|---|
| EP | 0 479 065 A2 | | 4/1992 |
| EP | 0 850 787 A1 | | 7/1998 |
| EP | 1 449 680 A1 | | 8/2004 |
| EP | 1 518 666 A2 | | 3/2005 |
| EP | 1 550 565 A2 | | 7/2005 |
| FR | 2 791 000 A1 | | 9/2000 |
| JP | 2001295134 A | * | 10/2001 |
| JP | 2004218189 A | * | 8/2004 |
| JP | 2006224949 A | * | 8/2006 |
| JP | 2006224951 A | * | 8/2006 |
| JP | 2006256600 A | * | 9/2006 |
| JP | 2006315515 A | * | 11/2006 |
| JP | 2006321275 A | * | 11/2006 |
| JP | 2006321384 A | * | 11/2006 |
| WO | WO-2006/077978 A1 | * | 7/2006 |

* cited by examiner

*Primary Examiner*—Adrienne C Johnstone
(74) *Attorney, Agent, or Firm*—Sughrue Mion, PLLC

(57) ABSTRACT

A radial tire for airplane comprises a pair of bead cores, a radial carcass, and a belt disposed on an outer periphery of a crown portion of the radial carcass and comprised of plural belt layers each containing organic fiber cords, in which a total strength in a circumferential direction over a full width of the belt $T_{belt}$(N) satisfies $T_{belt}/WD \geq 1.5 \times 10^6$ when an outer diameter of the tire is D (m) and a width of the tire is W (m), and at least one layer of the belt layers is constituted with an organic fiber cord spirally winding at an angle of approximately 0° with respect an equatorial plane of the tire and satisfying the following equations (I) and (II):

$$\sigma \geq -0.01E + 1.2 \qquad (I)$$

$$\sigma \geq 0.02 \qquad (II)$$

(wherein σ is a heat shrinkage stress at 177° C. (cN/dtex) and E is an elastic modulus at 25° C. under a load of 49 N (cN/dtex)).

5 Claims, 3 Drawing Sheets

RADIAL TIRE FOR AIRPLANE

BACKGROUND OF THE INVENTION

1. Field of the Invention

This invention relates to a radial tire for airplane, and more particularly to an airplane radial tire capable of establishing the high-speed durability and the weight reduction of the tire.

2. Description of the Related Art

The radial tire for airplane is defined to satisfy a basic internal pressure as very high as more than 10 atmospheric pressure as an official standard but also the reinforcing member for the tire is required to have a resistance top pressure corresponding to 4 times of the basic internal pressure in order to satisfy the requirement of higher reliability. In the belt of the tire, therefore, the resistance to pressure is satisfied by laminating many plies each comprised of organic fiber cords. On the other hand, it is imposed from airplane makers to satisfy the demand of significantly reducing the tire weight, and hence the establishment between the tire performances and the weight reduction is an important issue in the tire design.

The belt layer of the tire plays a hooping role for preventing the expansion of the tire crown portion in the radial direction, so that in order to efficiently obtain the resistance to pressure in the tire, it is preferable that the cords constituting the belt layer are arranged in parallel to an equatorial plane of the tire and are efficient to have a higher strength at breakage. From such a viewpoint, there is proposed a tire structure that organic fiber cord having a high strength at breakage is wound at an angle of approximately 0° with respect to the equatorial plane of the tire (see JP-A-63-4950).

This tire is excellent in the hoop effect and can effectively prevent the expansion of the tire crown portion. However, aramid fiber cord widely used as a constitutional member of the tire is poor in the heat shrinking property. Therefore, it is difficult to completely correct a slight non-uniformity of the strength between the cords generated in the shaping of the tire at a tire vulcanization step, and hence it is difficult to equally apply tension to belt cords in the pressure test for measuring the safety ratio of the tire. Since the utilization ratio of the strength in the tire member is low, it is required to arrange the excessive number of the members for satisfying the desired resistance to pressure though the strength at breakage of the member is high. Thus, the above cord property in the conventional tire product obstructs the weight reduction of the tire.

Also, standing wave is caused in the vicinity of the sidewall during the high-speed rotation of the tire to promote heat generation in the side portion, which considerably damages the durability of the tire. In order to prevent this problem, there is known that it is effective to increase tension in the circumferential direction of the belt at the shoulder portion of the tire during the running. For this end, the aramid fiber cords are usually used in the belt. In the belt, however, it is difficult to uniformly bear the tension between the cords as previously mentioned, so that it is also required to arrange the excessive number of the members for preventing the standing wave.

SUMMARY OF THE INVENTION

The invention is a subject matter to solve the aforementioned problems of the conventional techniques and is to provide a radial tire for airplane capable of establishing the improvement of the high-speed durability and the weight reduction of the tire.

According to the invention, there is the provision of a radial tire for airplane comprising a pair of bead cores, a radial carcass comprised of at least one carcass ply toroidally extending between the pair of bead cores, and a belt disposed on an outer periphery of a crown portion of the radial carcass and comprised of plural belt layers each containing organic fiber cords, in which a total strength in a circumferential direction over a full width of the belt $T_{belt}(N)$ satisfies $T_{belt}/WD \geq 1.5 \times 10^6$ when an outer diameter of the tire is D (m) and a width of the tire is W (m), and at least one layer of the belt layers is constituted with an organic fiber cord spirally wound at an angle of approximately 0° with respect to an equatorial plane of the tire and satisfying the following equations (I) and (II):

$$\sigma \geq -0.01E + 1.2 \qquad \text{(I)}$$

$$\sigma \geq 0.02 \qquad \text{(II)}$$

(wherein $\sigma$ is a heat shrinkage stress at 177° C. (cN/dtex) and E is an elastic modulus at 25° C. under 49 N (cN/dtex)).

In a preferable embodiment of the invention, a total strength KO of the belt layer in the circumferential direction per unit width at the equatorial plane PO of the tire and a total strength K2 of the belt in the circumferential direction per unit width at a position P2 corresponding to ⅔ of a maximum width W of the belt layer centering on the equatorial plane satisfy a relation of $0.2 \leq K2/KO \leq 0.8$.

In the radial tire for airplane according to the invention, the organic fiber cord satisfying the equations (I) and (II) is preferable to be a polyketone fiber cord.

According to the invention, the organic fiber cord satisfying the particular properties is used as a reinforcing member in at least one belt layer constituting the belt, whereby it is possible to improve the high-speed durability and attain the weight reduction in the radial tire for airplane.

BRIEF DESCRIPTION OF THE DRAWINGS

The invention will be described in detail with reference to the accompanying drawings, wherein.

DESCRIPTION OF THE PREFERRED EMBODIMENTS

Figure 1:
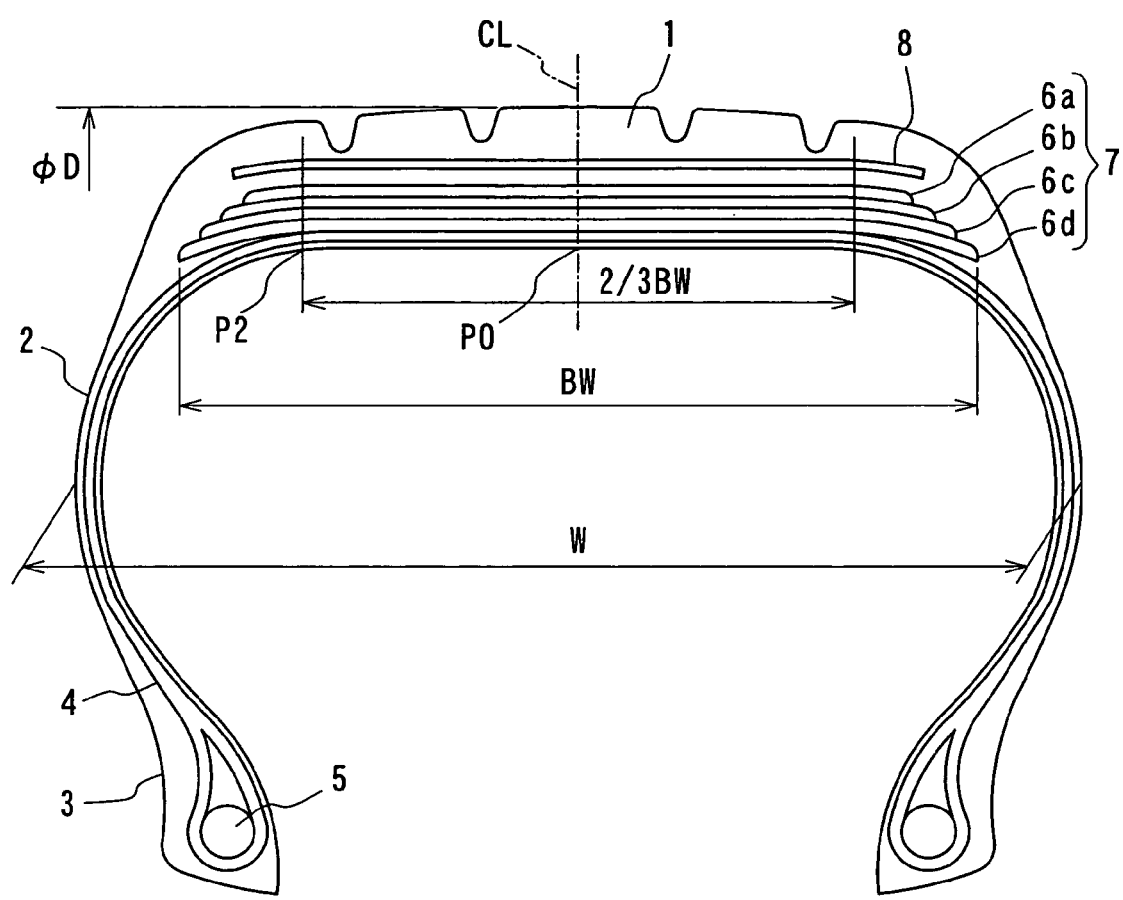
FIG. 1 is a diagrammatically cross-section view of a radial tire for airplane according to the invention.

FIG. 1 is a diagrammatically cross-section view of a radial tire for airplane according to the invention. In FIG. 1, numeral 1 is a tread portion, numeral 2 a pair of sidewall portions continuously extending inward from side ends of the tread portion 1 in a radial direction, and numeral 3 a bead portion continuously arranged at an inner peripheral side of each of the sidewall portion 2.

Also, a radial carcass 4 comprised of at least one carcass ply is toroidally extended between both the bead portions 3. The radial carcass 4 reinforcing the portions 1, 2 and 3 is arranged so that each side portion thereof is wound around a circular ring-shaped bead core 5 embedded in the bead portion 3 from inside toward outside.

On an outer periphery of a crown portion of the radial carcass 4 is disposed a belt 7 comprised of plural belt layers 6.

Moreover, a belt protection layer 8 may be arranged on an outside of the belt in the radial direction.

In the invention, when an outer diameter of the tire is D (m) and a width of the tire is W (m), a total strength in the circumferential direction over a full width of the belt $T_{belt}$(N) is defined as $T_{belt}/WD \geqq 1.5 \times 10^6$, whereby a high safety ratio required as a resistance to pressure in the airplane tire is attained. When T/WD is less than $1.5 \times 10^6$ as described in the following examples, it is difficult to satisfy the predetermined safety ratio and the official standard can not be satisfied.

The term "total strength" used herein indicates a strength of the belt in the circumferential direction and is a value calculated by multiplying a strength of one cord by the number of cords. Moreover, when the cord is inclined at an angle θ with respect to the circumferential direction, the total strength is calculated by multiplying the above strength by cos θ. At this moment, the total strength in the circumferential direction over the full width of the belt is a sum of cord strength on all cords constituting the belt.

In the embodiment of FIG. 1, the belt 7 is comprised of four belt layers 6 (6a, 6b, 6c, 6d). The number of the belt layers is not limited to the embodiment of FIG. 1, and it may be selected properly. In the invention, at least one belt layer among the belt layers 6 constituting the belt 7 is constituted with an organic fiber cord spirally wound at an angle of approximately 0° with respect to an equatorial plane of the tire and satisfying the particular condition of heat shrinkage stress as mentioned later.

Among the four belt layers 6a-6d shown in FIG. 1, at least one layer has a distinctive spiral wound form and a particular heat shrinkage stress. The case that the belt layer 6a has a distinctive spiral wound form and a particular heat shrinkage stress will be explained below.

Figure 2:
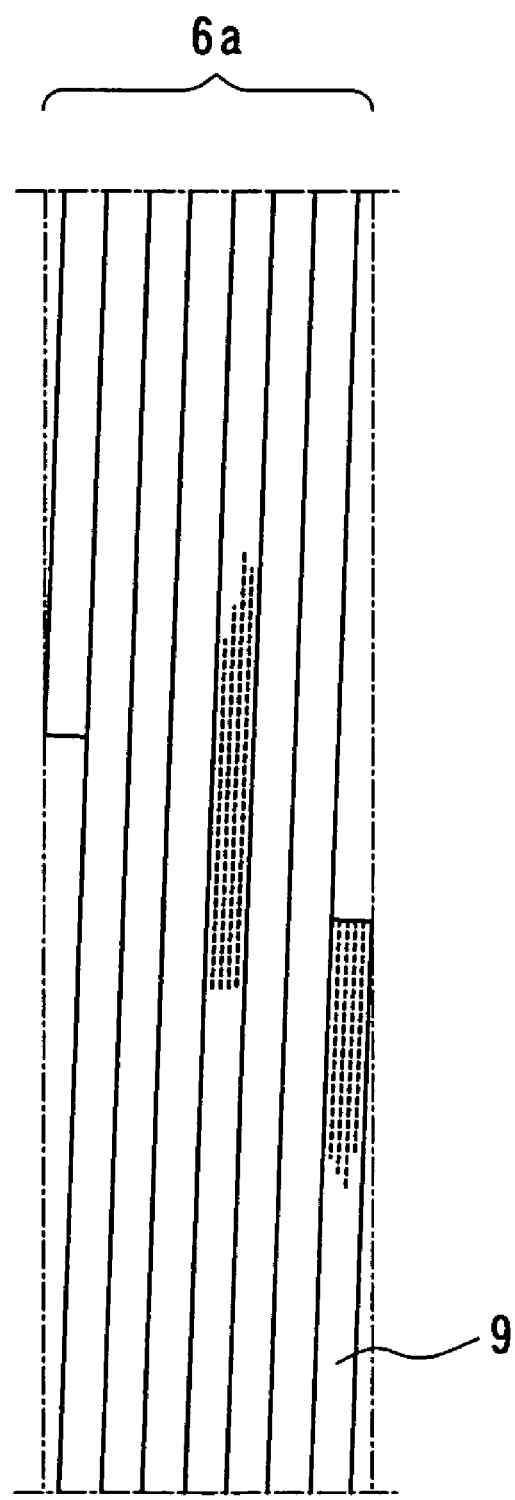
FIG. 2 is a plan view showing a spiral belt structure in the radial tire for airplane according to the invention.

FIG. 2 is a plan view showing a belt layer in which the cord is spirally wound at an angle of approximately 0° with respect to an equatorial plane PO of the tire, i.e. a spiral belt layer 6a. As shown in FIG. 2, the belt layer 6a or so-called spiral belt is formed by covering one or more organic fiber cords with rubber to form a band-shaped elongate body 9, and spirally winding the elongate body 9 so as not to form a gap between the wound elongate bodies.

In the invention, the organic fiber cord constituting the belt layer 6a having the distinctive spiral wound form has a heat shrinkage stress σ at 177° C. satisfying conditions of the following equations (I) and (II):

$$\sigma \geqq -0.01E + 1.2 \quad \text{(I)}$$

$$\sigma \geqq 0.02 \quad \text{(II)}$$

wherein σ is a heat shrinkage stress at 177° C. (cN/dtex) and E is an elastic modulus at 25° C. under 49 N (cN/dtex). Moreover, the heat shrinkage stress a is a stress generated at 177° C. in the organic fiber cord when a sample of the organic fiber cord of 25 cm in length subjected to a usual dipping treatment prior to the vulcanization is heated at a temperature rising rate of 5° C./min, while the elastic modulus E of the organic fiber cord at 25° C. under 49 N is an elastic modulus as a unit of cN/dtex calculated from a tangent line at 49 N in SS curve by a tensile test of cord according to JIS.

The organic fiber cord satisfying the conditions of the equations (I) and (II) is preferable to be a polyketone fiber cord. In the equations (I) and (II), a changes in accordance with the kind of the polyketone, but when the same polyketone is used, the value of a is changed by changing the twist number or the dipping condition in the preparation of the cord. Moreover, the value of a in the equations (I) and (II) is preferable to be $0.4 \geqq \sigma \geqq 1.5$. When the value of σ exceeds 1.5, the shrinking force during the vulcanization becomes too large, and as a result, the disorder of the cords or rubber arrangement is caused inside the tire, which may cause the deteriorations of the durability and the uniformity. In order to obtain the effect of the invention, the value of σ is preferable to be not less than 0.4.

As the polyketone fiber cord satisfying the equations (I) and (II) can be used a polyketone fiber cord substantially having a repeated unit represented by the following formula (III):

(wherein A is a moiety derived from an unsaturated compound polymerized through unsaturated bonds, and may be same or different in repeated units). Among the polyketones, a polyketone in which not less than 97 mol % of the repeated unit is 1-oxotrimethylene (—$CH_2$—$CH_2$—CO—) is preferable, and a polyketone in which not less than 99 mol % is 1-oxotrimethylen is further preferable, and a polyketone in which 100 mol % is 1-oxotrimethyle is most preferable.

In a starting polyketone for the polyketone fiber cord, ketone groups may be partly bonded to each other or moieties derived from the unsaturated compound may be bonded to each other, but it is preferable that a ratio of alternate arrangement of the moiety derived from the unsaturated compound and the ketone group is not less than 90% by mass, more preferably not less than 97% by mass, most preferably 100% by mass.

As the unsaturated compound forming A in the formula (III) is most preferable ethylene. Also, there may be an unsaturated hydrocarbon other than ethylene such as propylene, butene, pentene, cyclopentene, hexene, cyclohexene, heptene, octene, nonene, decene, dodecene, styrene, acetylene, allene or the like; a compound containing an unsaturated bond such as methyl acrylate, methyl metacrylate, vinyl acetate, acrylamide, hydroxyethyl methacrylate, undecenic acid, undecenol, 6-chlorohexene, N-vinylpyrolidone, diethylester of sulnylphosphric acid, sodium styrenesulfonate, sodium allylsulfonate, vinylpyrolidone, vinyl chloride or the like; and so on.

As the polymerization degree of the polyketone, it is preferable that a limit viscosity (η) defined by the following equation (IV):

$$[\eta] = \lim_{C \to 0} \frac{(T - t)}{(t \cdot C)}$$

(wherein t is a passing time of hexafluoroisopropanol having a purity of not less than 98% through a viscosity tube, and T is a passing time of a diluted solution of polyketone dissolved in hexafluoropropanol at 25° C. through the viscosity tube, and C is a mass (g) of a solute in 100 mL of the diluted solution) is within a range of 1-20 dL/g, more preferably 2-10 dL/g, further preferably 3-8 dL/g. When the limit viscosity is less than 1 dL/g, the molecular weight is too small and it is difficult to obtain a high-strength polyketone fiber cord, but also troubles such as napping, breaking and the like are frequently caused in the steps of spinning, drying and drawing.

While, when the limit viscosity exceeds 20 dL/g, the synthesis of the polymer takes great time and cost, but also it is difficult to uniformly dissolve the polymer, which may badly affect the spinability and properties.

As a method of forming polyketone fiber are preferable (1) a method of subjecting an undrawn fiber to a multi-stage heat drawing in which a final drawing at the multi-stage heat drawing step is carried out at specified temperature and draft ratio and (2) a method of subjecting an undrawn fiber to heat drawing and then quenching under a high tension. By forming the polyketone fiber through the method (1) or (2) can be obtained desirable filaments suitable for the production of the polyketone fiber cord.

The method of spinning the polyketone undrawn fiber is not particularly limited, but may adopt the conventionally known methods. Concretely, there are mentioned a wet spinning method using an organic solvent as disclosed in JP-A-H02-112413, JP-A-H04-228613 and JP-A-H04-505344, and a wet spinning method using an aqueous solution of zinc salt, calcium salt, thiocyanate, iron salt or the like as disclosed in WO99/18143, WO00/09611, JP-A-2001-164422, JP-A-2004-218189 and JP-A-2004-285221. Among them, the wet spinning method using the aqueous solution of the salt is preferable.

In the wet spinning method using the organic solvent, a polyketone polymer is dissolved in hexafluoroisopropanol, m-cresol or the like at a concentration of 0.25-20% by mass and extruded through a spinning nozzle to form a fiber and then the solvent is removed in a non-solvent bath of toluene, ethanol, isopropanol, n-hexane, isooctane, acetone, methyl ethyl ketone or the like, whereby the polyketone undrawn fiber can be obtained after the washing.

In the wet spinning method using the aqueous solution, the polyketone polymer is dissolved in an aqueous solution of zinc salt, calcium salt, thiocyanate, iron salt or the like at a concentration of 2-30% by mass and extruded from a spinning nozzle into a coagulation bath at 50-130° C. to conduct gel spinning and then desalted and dried to obtain the polyketone undrawn fiber. In the aqueous solution dissolving the polyketone polymer, it is preferable to use a mixture of a zinc halide and a halide of an alkali metal or an alkaline earth metal. In the coagulation bath can be used water, an aqueous solution of a metal salt, or an organic solvent such as acetone, methanol or the like.

As the method of drawing the undrawn fiber is preferable a heat drawing method wherein the undrawn fiber is drawn by heating to a temperature higher than the glass transition temperature of the undrawn fiber. Moreover, the drawing of the undrawn fiber in the above method (2) may be carried out at one stage, but it is preferable to conduct the multi-stage drawing. The heat drawing method is not particularly limited, and may adopt a method of running the fiber on, for example, a heating roll or a heating plate, and so on. At this moment, the heat drawing temperature is preferably within a range of 110° C. to a melting point of polyketone, and the total drawing ratio is preferably not less than 10 times.

When the formation of the polyketone fiber is carried out by the method (1), the temperature at the final drawing step of the multi-stage drawing is preferable to be within a range of 110° C. to (drawing temperature at drawing step back to the final drawing step −3° C.), while the drawing ratio at the final drawing step is preferable to be within a range of 1.01-1.5 times. When the formation of the polyketone fiber is carried out by the method (2), the tension applied to the fiber after the heat drawing is preferable to be within a range of 0.5-4 cN/dtex. Also, the cooling rate in the quenching is preferable to be not less than 30° C./second, and the cooling-end temperature in the quenching is preferable to be not higher than 50° C. The quenching method of the heat-drawn polyketone fiber is not particularly limited, and may adopt the conventionally known methods. Concretely, the cooling method using the roll is preferable. Moreover, the thus obtained polyketone fiber is large in the retention of elastic strain, so that it is preferable that the fiber is usually subjected to a relaxation heat treatment so as to make the fiber length shorter than the fiber length after the heat drawing. At this moment, the temperature of the relaxation heat treatment is preferable to be within a range of 50-100° C. and the relaxation ratio is preferable to be within a range of 0.980-0.999.

In this way, the polyketone fiber cord having high elastic modulus and strength at breakage is used in at least one layer of the belt layers 6 constituting the belt 7 and spirally wound at an angle of approximately 0° with respect to the equatorial plane PO of the tire, whereby it is possible to obtain an excellent hoop effect in the tire crown portion.

Since the polyketone fiber has a moderate heat shrinkability, the cord is shrunk in the tire vulcanization, and hence it is possible to correct the slight non-uniformity of cord tension generated in the shaping of the tire. As a result, even if a high internal pressure is applied in the pressure test, it is possible to equally apply the internal pressure to each of the belt cords. Therefore, the utilization ratio of the cord can be improved and the resistance to pressure can be also improved. Similarly, it is possible to uniformly apply to the each cord even in the shoulder portion of the tire by the above effect of heat shrinkage. As a result, it is possible to effectively suppress the standing wave during the high-speed running, which can provide an excellent high-speed durability.

Although the above is described with respect to the case that the belt layer 6a has the distinctive spiral wound form and the particular heat shrinkage stress, the invention is not limited to the above case. As a preferable embodiment of the invention, all of the belt layers 6a-6d may have a distinctive spiral wound form and a particular heat shrinkage stress. Alternatively, two or three layers among the belt layers 6a-6d may have a distinctive spiral wound forma and a particular heat shrinkage stress. In the latter case, the remaining layer may have optional form and heat shrinkage stress and does not necessarily satisfy the construction of the invention. Also, the remaining layer may be constituted with the polyketone fiber cord or other fiber cord such as nylon fiber cord, aramid fiber cord or the like.

Figure 3:
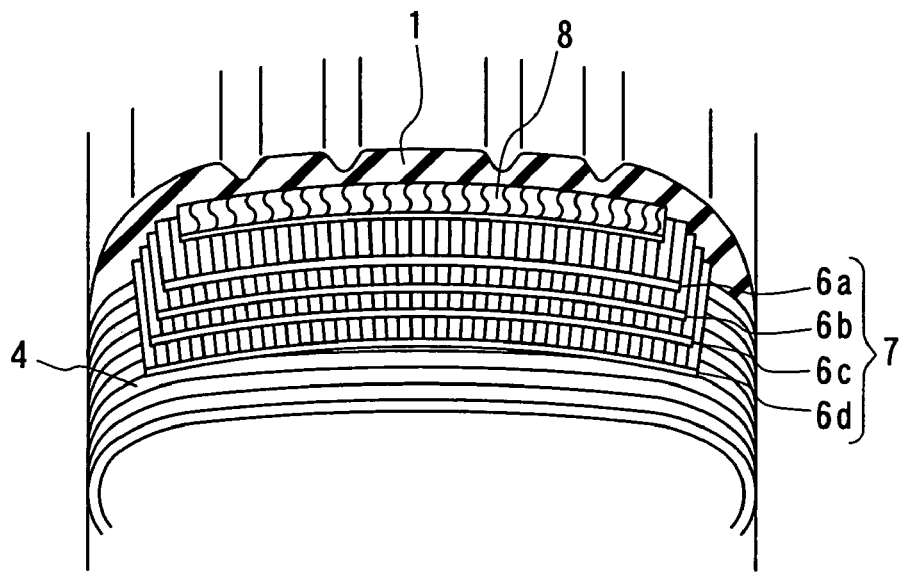
FIG. 3 is a partially cutaway perspective view illustrating a detail of a belt structure in the radial tire for airplane according to the invention.

FIG. 3 is a partially cutaway perspective view showing a detail of a belt structure in an embodiment of the radial tire for airplane according to the invention, in which all of four layers have the distinctive spiral wound form and the particular heat shrinkage stress.

Figure 4:
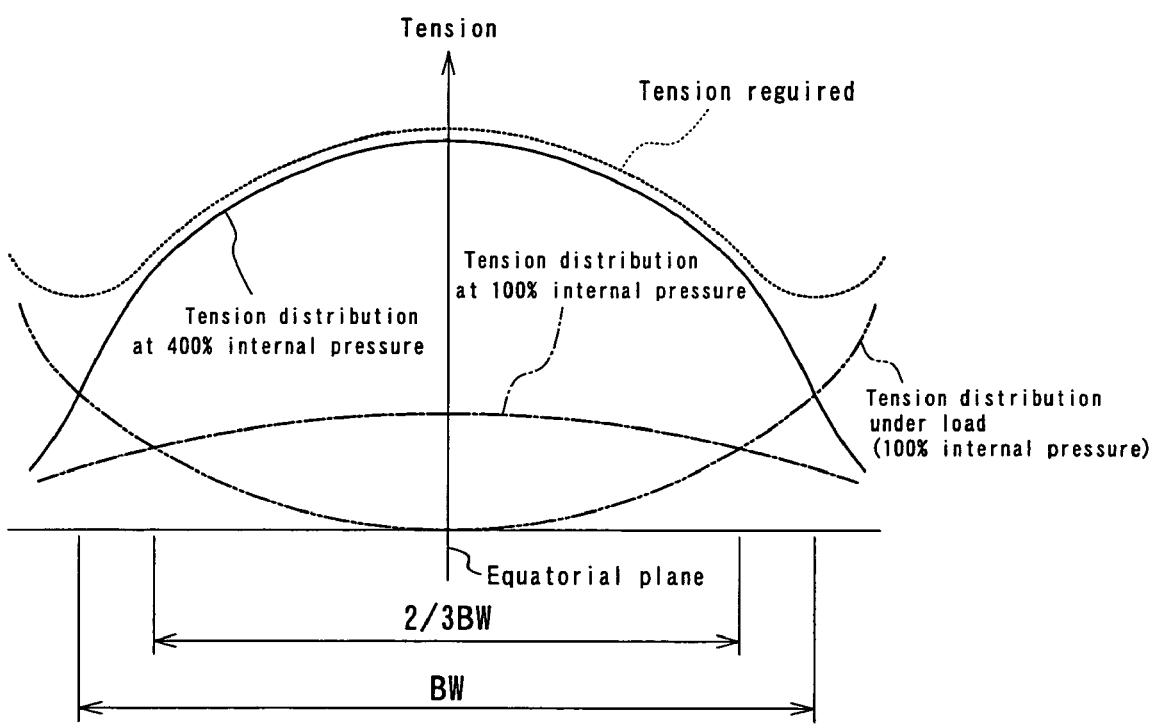
FIG. 4 is a view illustrating a distribution of a belt tension in the radial tire for airplane according to the invention.

Further, the distribution of belt tension is examined. As result, it has been found that when the radial tire keeps the internal pressure, the belt portion during the running develops a tension distribution as shown in FIG. 4 and the tension is highest in the central portion of the belt. From this knowledge, it is designed that the resistance to pressure can be efficiently given to the tire by arranging a greater number of belt layers in the central portion of the belt. Concretely, the belt layers are arranged so that a total strength KO of the belt layer in the circumferential direction per unit width at the equatorial plane PO of the tire and a total strength K2 of the belt in the circumferential direction per unit width at a position P2 corresponding to ⅔ of a maximum width W of the belt layer centering on the equatorial plane satisfy a relation of $0.2 \geq K2/KO \geq 0.8$. As a result, it is possible to realize the weight reduction at maximum while satisfying the resistance to pressure and the high-speed durability in the tire.

Moreover, the total strength per unit width at the specified position (PO, P2) of the belt means a value obtained by multiplying the cord strength by the number of cords per unit width.

When K2/KO is less than 0.2, the belt rigidity in the shoulder portion is insufficient, and hence the desired resistance to pressure can not be ensured. While, when K2/KO exceeds 0.8, the excessive number of the members are arranged in the shoulder portion, which results in the increase of the weight. Thus, when the relation of $0.2 \geqq K2/KO \geqq 0.8$ is satisfied, the maximum weight reduction can be attained as shown in the following examples.

The following examples are given in illustration of the invention and are not intended as limitations thereof.

In order to confirm the effect of the invention, there are provided one conventional tire (aramid fiber) and three example tires and two comparative tires, and the tire weight, safety ratio and high-speed durability are measured. Moreover, the tire size is 46×17R20 30PR. The evaluated results on the performances of these tires are shown in Table 1. Moreover, Examples 1 and 2 are a case that each of four belt layers is constituted with the polyketone fiber cord spirally winding in the circumferential direction, and Example 3 is a case that each of two belt layers is constituted with the polyketone fiber cord spirally winding in the circumferential direction and each of the remaining two belt layers is constituted with nylon fiber cord winding zigzag in the circumferential direction.

All of the belt layers in the tire of Table 1 has a circumferentially spiral wound belt structure shown in FIGS. 2 and 3. Also, the angle (°) in Table 1 means an angle with respect to an equatorial plane of the tire.

In Table 1, the tire weight is represented by an index on the basis that the conventional tire is 100, in which the smaller the numerical value, the lighter the tire weight.

The safety ratio (times) is a ratio of a pressure breaking the tire when water is filled in the tire assembled into the rim to raise the internal pressure with respect to the basic internal pressure defined in TRA. In TSO defined in FAA, the safety ratio of the airplane tire is regulated to be not less than 4 times. The larger the numerical value of the safety ratio, the higher the pressure required for the tire breakage and the better the safety. In this example, the safety ratio is evaluated by filling the interior of the tire with water and raising a pressure at a constant rate through a hydraulic pump up to 4 times of the basic internal pressure for 10 minutes.

The high-speed durability is evaluated by repeating a test of takeoff and landing defined in the official standard on a drum testing machine under a basic internal pressure and a basic load to measure the test number until the tire trouble is caused, and represented by an index on the basis that the test number of Conventional Example 1 is 100, in which the larger the numerical value, the better the high-speed durability. Moreover, the high-speed durability in this example is evaluated as the test number until the troubles are caused when repeating the takeoff test under such a condition that the speed is accelerated from zero to a nominal speed at a constant rate under the basic internal pressure and load defined in TRA so as to arrive the running distance at 11,500 feet.

TABLE 1

| | | Conventional Example | Example 1 | Example 2 | Example 3 | Comparative Example 1 | Comparative Example 2 |
|---|---|---|---|---|---|---|---|
| Outer diameter of tire D (m) | | 1.17 | 1.17 | 1.17 | 1.17 | 1.17 | 1.17 |
| Width of tire W (m) | | 0.43 | 0.43 | 0.43 | 0.43 | 0.43 | 0.43 |
| Belt structure | Kind of cord | aramid | polyketone | polyketone | polyketone (first and second) nylon (third and fourth) | polyketone | polyketone |
| | σ (cN/dtex) | 0 | 0.5 | 0.5 | 0.5 (polyketone) 0.2 (nylon) | 0.5 | 0.3 |
| | E (cN/dtex) | 160 | 155 | 155 | 155 (polyketone) 40 (nylon) | 155 | 40 |
| | Structure | circumferentially spiral wound belt | circumferentially spiral wound belt | circumferentially spiral wound belt | spiral (first and second) zigzag (third and fourth) | circumferentially spiral wound belt | circumferentially spiral wound belt |
| | Layer number | 6 | 4 | 4 | 2 + 2 | 2 | 4 |
| | Belt width (m) (first and second) | 0.336 | 0.336 | 0.336 | 0.336 | 0.336 | 0.336 |
| | Belt width (m) (third and fourth) | 0.326 | 0.326 | 0.168 | 0.326 | | 0.326 |
| | Belt width (m) (fifth and sixth) | 0.316 | — | — | — | — | — |
| | Number of cords (total of belt widths) | 953 | 953 | 726 | 483 (spiral) 469 (zigzag) | 484 | 953 |
| | Cord strength t (N) | 1520 | 1450 | 1450 | 1450 (polyketone) 787 (nylon) | 1450 | 1300 |
| | Angle (°) | 0 | 0 | 0 | 0 (spiral) 10 (zigzag) | 0 | 0 |
| | $T_{belt}$ (N) | $1.45 \times 10^6$ | $1.38 \times 10^6$ | $1.05 \times 10^6$ | $1.07 \times 10^6$ | $0.70 \times 10^6$ | $1.24 \times 10^6$ |
| | T/WD | $2.88 \times 10^6$ | $2.75 \times 10^6$ | $2.09 \times 10^6$ | $2.13 \times 10^6$ | $1.39 \times 10^6$ | $2.47 \times 10^6$ |
| | KO (N/mm) | 4378 | 4176 | 4176 | 3221 | 2088 | 3744 |
| | K2 (N/mm) | 4378 | 4176 | 2088 | 3221 | 2088 | 3744 |
| | K2/KO | 1 | 1 | 0.5 | 1 | 1 | 1 |

TABLE 1-continued

|  |  | Conventional Example | Example 1 | Example 2 | Example 3 | Comparative Example 1 | Comparative Example 2 |
|---|---|---|---|---|---|---|---|
| Tire performances | Tire weight (index) | 100 | 95 | 95 | 94 | 91 | 95 |
|  | Safety ratio (times) | 4.5 | 4.8 | 4.9 | 4.3 | 3.5 | 4.4 |
|  | High-speed durability (index) | 100 | 45 | 105 | 100 | 101 | 98 |

As seen from the above, the examples tires have good performances on all of tire weight, safety ratio and high-speed durability as compared with the conventional example and comparative examples. On the other hand, the tire of Comparative Example 1 does not satisfy the safety ratio of not less than 4 times. When Example 1 is compared with Example 2, the value of K2/KO in Example 2 satisfies the range of 0.2-0.8, so that Example 2 is more excellent in the weight reduction of the tire.

In the radial tire for airplane, at least one layer of belt layers constituting the belt as a reinforcing member has a spiral structure and is constituted with the organic fiber cord satisfying the particular properties, whereby it is made possible to improve the high-speed durability in the radial tire for airplane and attain the weight reduction of the tire. The tire according to the invention has such excellent properties and is useful as a radial tire for airplane.

What is claimed is:

1. A radial tire for airplane comprising a pair of bead cores, a radial carcass comprised of at least one carcass ply toroidally extending between the pair of bead cores, and a belt disposed on an outer periphery of a crown portion of the radial carcass and comprised of plural belt layers each containing organic fiber cords, in which a total strength in a circumferential direction over a full width of the belt $T_{belt}$ in N satisfies $T_{belt}/WD \geq 1.5 \times 10^6$ when an outer diameter of the tire is D in m and a width of the tire is W in m, and at least one layer of the belt layers is constituted with an organic fiber cord spirally winding at an angle of approximately 0° with respect to an equatorial plane of the tire and satisfying the following equations I and II:

$$\sigma \leq -0.01E + 1.2 \quad \text{equation I}$$

$$\sigma \geq 0.02 \quad \text{equation II}$$

wherein σ is a heat shrinkage stress at 177° C. in cN/dtex and E is an elastic modulus at 25° C. under a load of 49 N in cN/dtex.

2. A radial tire for airplane according to claim 1, wherein a total strength KO of the belt layer in the circumferential direction per unit width at the equatorial plane PO of the tire and a total strength K2 of the belt in the circumferential direction per unit width at a position P2 corresponding to ⅔ of a maximum width W of the belt layer centering on the equatorial plane satisfy a relation of $0.2 \leq K2/KO \leq 0.8$.

3. A radial tire for airplane according to claim 1, wherein the organic fiber cord satisfying the equations I and II is a polyketone fiber cord.

4. A radial tire for airplane according to claim 3, wherein the polyketone fiber cord satisfying the equations I and II is a polyketone fiber cord substantially having a repeated unit represented by the following formula III:

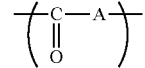

formula III wherein A is a moiety derived from an unsaturated compound polymerized through unsaturated bonds, and may be same or different in repeated units.

5. A radial tire for airplane according to claim 4, wherein A in the formula III is ethylene.

* * * * *